United States Patent [19]

Kimura et al.

[11] Patent Number: 4,532,561
[45] Date of Patent: Jul. 30, 1985

[54] PLAYBACK SPEED CONTROL SYSTEM

[75] Inventors: Hiroyuki Kimura, Yokohama; Yoshimi Iso; Shigeki Inoue, both of Toyokawa; Takashi Takeuchi, Fujisawa; Shin-ichi Ohashi, Chigasaki, all of Japan

[73] Assignee: Hitachi, Ltd., Tokyo, Japan

[21] Appl. No.: 428,209

[22] Filed: Sep. 29, 1982

[30] Foreign Application Priority Data

Sep. 30, 1981 [JP] Japan .................. 56-153701
Sep. 30, 1981 [JP] Japan .................. 56-153703
Sep. 30, 1981 [JP] Japan .................. 56-153707
Mar. 10, 1982 [JP] Japan .................. 57-36368

[51] Int. Cl.³ .................. G11B 15/52; G11B 19/28
[52] U.S. Cl. .................. 360/73
[58] Field of Search .................. 360/73

[56] References Cited

U.S. PATENT DOCUMENTS 4,296,446 10/1981 Zorbalas .................. 360/73

FOREIGN PATENT DOCUMENTS 0049136 4/1982 European Pat. Off. .............. 360/73

Primary Examiner—George G. Stellar
Attorney, Agent, or Firm—Antonelli, Terry & Wands

[57] ABSTRACT

Disclosed is a disc or tape signal reproducing apparatus having a first speed control loop in which the duration of a specific pulse in the PCM signal recorded on the disc or tape is detected and the current sync signal interval is anticipated from the duration of the pulse so that the motor speed is pulled into the operation range of the sync signal detector, and a second speed control loop which controls the motor speed basing on the sync signal reproduced by the sync signal detector. The motor speed is controlled by the first speed control loop until the sync signal detector detects the sync signal, thereafter the motor speed is controlled by the second speed control loop basing on the reproduced sync signal.

12 Claims, 19 Drawing Figures

FIG. 14

COMPARISON OF FUNCTIONS

| | | ARRANGEMENT OF FIG. 9 | ARRANGEMENT OF FIG. 13 |
|---|---|---|---|
| 1 | MAX. PULSE WIDTH DETECTOR | 15a, 15b<br>COUNT vs PULSE WIDTH (linear) | 16<br>COUNT vs PULSE WIDTH with limit A at CENTER VALUE<br>COUNTER WITH LIMITER |
| 2 | PSEUDO SYNC PERIOD (ARITHMETIC OPERATION OUTPUT) | 15c<br>PSEUDO SYNC PERIOD vs COUNT (linear) | 17<br>PSEUDO SYNC PERIOD vs COUNT with limits B, C around CENTER VALUE A<br>ARITHMETIC UNIT WITH LIMITER |
| 3 | SYNC PERIOD COUNTER | 8b<br>COUNT vs SYNC PERIOD (linear) | 18<br>COUNT vs SYNC PERIOD (sawtooth) with B, C<br>REPETITION-TYPE COUNTER |

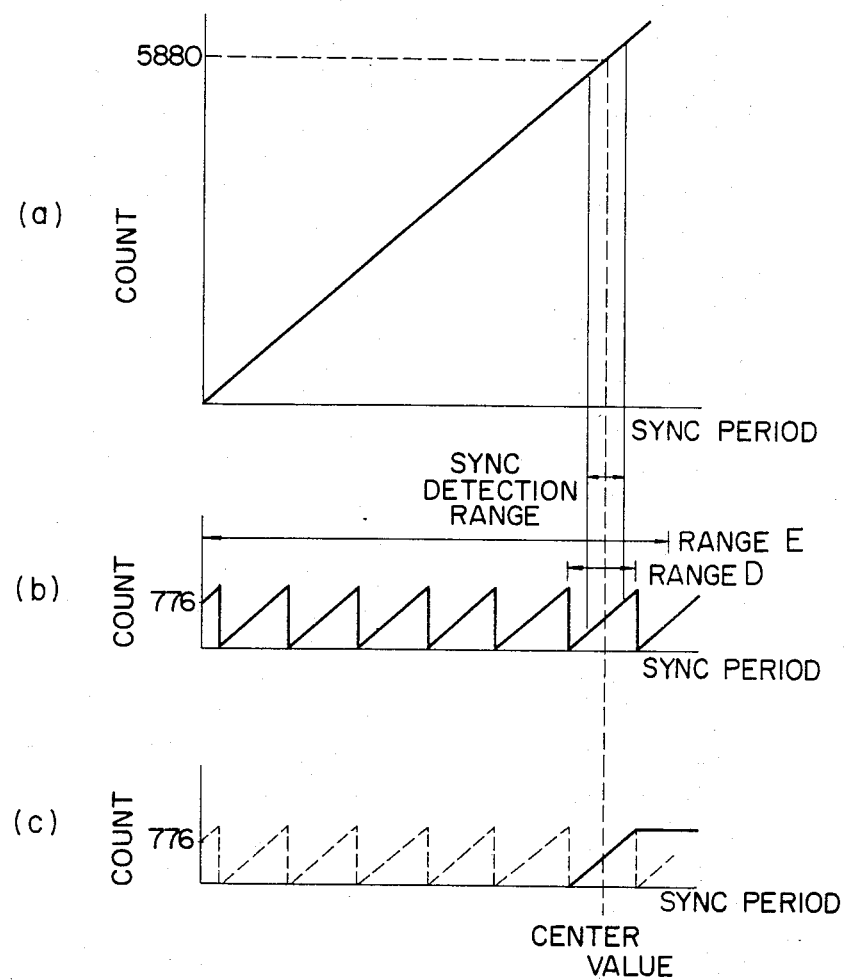

PLAYBACK SPEED CONTROL SYSTEM

The present invention relates to a motor speed control system for maintaining a constant playback speed for a tape or disc signal reproducing apparatus.

The PCM recording system, in which analog signal is transformed into digital signal by an analog-to-digital converter, sync signals are recorded additionally at every partition of the signal, sync signals are detected in the picked-up signal in reproduction, the digital signal is reproduced basing on the sync signals, and the original analog signal is retrieved by a digital-to-analog converter, have the advantage of being unaffected by the distortion of the recording medium and thus less deterioration in the quality of sound, and therefore popularization of the PCM reording system is expected.

In PCM recording, a digitized signal is further modulated and recorded as a pulse train including several different pulse widths. FIG. 1 exemplifies the recorded signal form adopted in Digital Audio Disc Player of Compact Disc system, showing in (a) the contents of the recorded signal and corresponding digital signal form in (b). In FIG. 1, the clock interval defines a unit period T, and the sync signal is formed of a high level for a duration of 11T and a following low level for a duration of 11T or a low level for a duration of 11T and a following high level for a duration of 11T, while information signals are formed in pulses having durations of not longer than 11T and not shorter than 3T. Expression 3T through 10T in FIG. 1(b) signifies the duration of a high level or low level of each pulse. Accordingly, in this example, a combination of a high level pulse of 11T and a low level pulse of 11T is identified as a sync signal.

FIG. 2 exemplifies the reproducing system for the PCM signal recorded as mentioned above on a disc. The system arrangement of FIG. 2 includes a digital audio disc 1, a pickup 2, a disc drive motor 3, a code demodulator 4, a sync signal detector 5, a digital processing circuit 6, a digital-to-analog (D/A) converter 7, a frequency-to-voltage (f/v) converter 8, a reference voltage source 9, and an error amplifier 10. In operation, a signal read out on the disc 1 by the pickup 2 is demodulated into a digital signal by the code demodulator 4 as it was before the recording modulation, then fed to the sync signal detector 5 and digital processing circuit 6. The sync signal detector 5 retrieves sync signals in the recorded signal, and the digital processing circuit 6 partitions the digital signal basing on the sync signals and corrects errors created during transmission, then the D/A converter 7 reproduces the original analog signal. The digital audio disc 1 employs the constant linear velocity (CLV) system in which the tangential disc speed at the pickup is constant irrespective of its radial position on the disc in order to enhance the recording density. Consequently, information is recorded on the disc 1 such that sync signals are placed at a constant interval, and thus the reproducing system is required to control the disc speed so that sync signals are read out at a constant interval. For this purpose, reproduced sync signals from the sync signal detector 5 are transformed into a voltage signal by the frequency-to-voltage converter 8, then fed back through the error amplifier 10 to the disc drive motor 3 so that the motor speed, i.e., the disc speed, is controlled. The voltage source 9 provides a reference voltage for rotating the disc 1 at a constant speed.

The foregoing description is based on the assumption that the disc 1, i.e., the motor 3, rotates at the specified speed, the code demodulator 4 evaluates the pulse widths of the information signals and sync signals correctly, and the sync signal detector 5 retrieves correct sync signals.

As can be seen from the signal waveform shown in FIG. 1, sync signals and information signals must be distinguished basing on the pulse width of 11T or shorter than 11T. This limits the range of speed in which the sync signal detector 5 can identify sync signals as shown in FIG. 3. FIG. 3 shows at Ⓐ the speed range in which sync signals can be detected and the above-mentioned speed control is performed within this speed range. However, in ranges Ⓑ and Ⓑ' where sync signals cannot be detected, it is impossible to reproduce information recorded on the disc 1.

Particularly, in reproducing a digital audio disc which has been recorded in CLV system, the rotational speed of the motor 3 varies depending on the radial position of the pickup 2 on the disc, i.e., the motor speed needs to decrease as the pickup 2 moves toward the outer periphery of the disc 1. Reproduction from this type of disc encounters a first problem at starting. Assuming that the motor 3 is energized so as to increase the speed while the f/v converter 8 provides no output, the sync signal detector 5 may retrieve sync signals on a transient basis, but the motor speed cannot always be controlled satisfactorily due to the response characteristics of the system. Another problem is that when the pickup 2 is moved at random beyond the detection range of the sync signal detector 5, the motor speed in the range Ⓑ or Ⓑ' in FIG. 3 can no longer be recognized and information of gaining or slowing down the motor speed cannot be obtained.

Accordingly, it is an object of the present invention to provide a playback speed control system which overcomes the foregoing prior art deficiencies and brings the disc speed to the specified speed from an arbitrary speed.

The present invention utilizes the fact that the PCM signal is made up of pulses having several different pulse widths, and there are provided a first speed control loop in which the pulse width of a specific pulse (e.g., the pulse width of the widest pulse) is measured so as to anticipate the present sync signal interval from the duration of the pulse and the motor is controlled so that the motor speed is pulled into the operating range of the sync signal detector, and a second speed control loop in which the motor speed is controlled basing on sync signals retrieved by the sync signal detector, whereby the motor speed is controlled by the first speed control loop until the sync signal detector detects sync signals, thereafter it is controlled by the second speed control loop based on the retrieved sync signals.

FIG. 14 is a set of diagrams comparing the functions of the blocks shown in FIG. 13;

Figure 16:
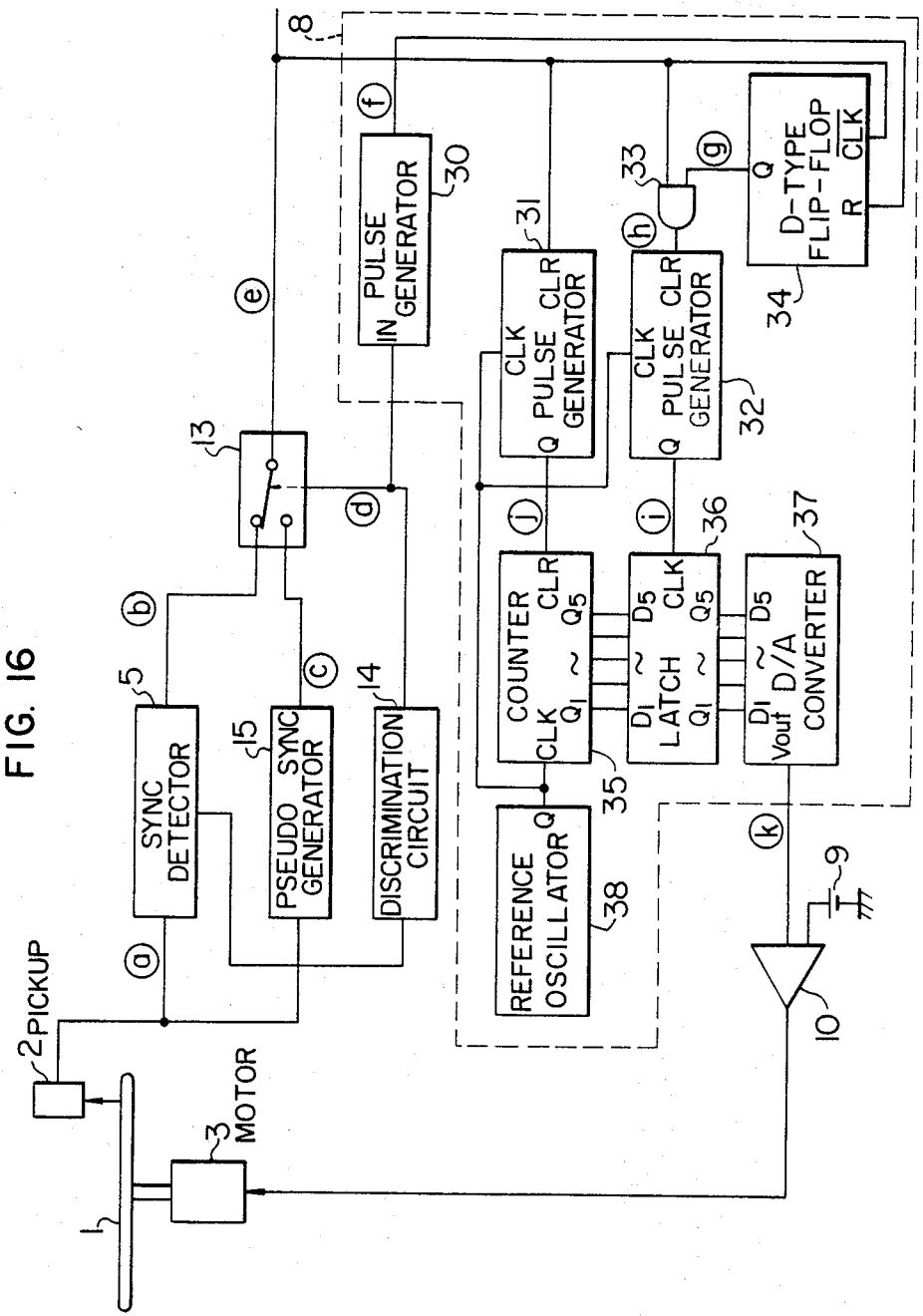
Figure 17:
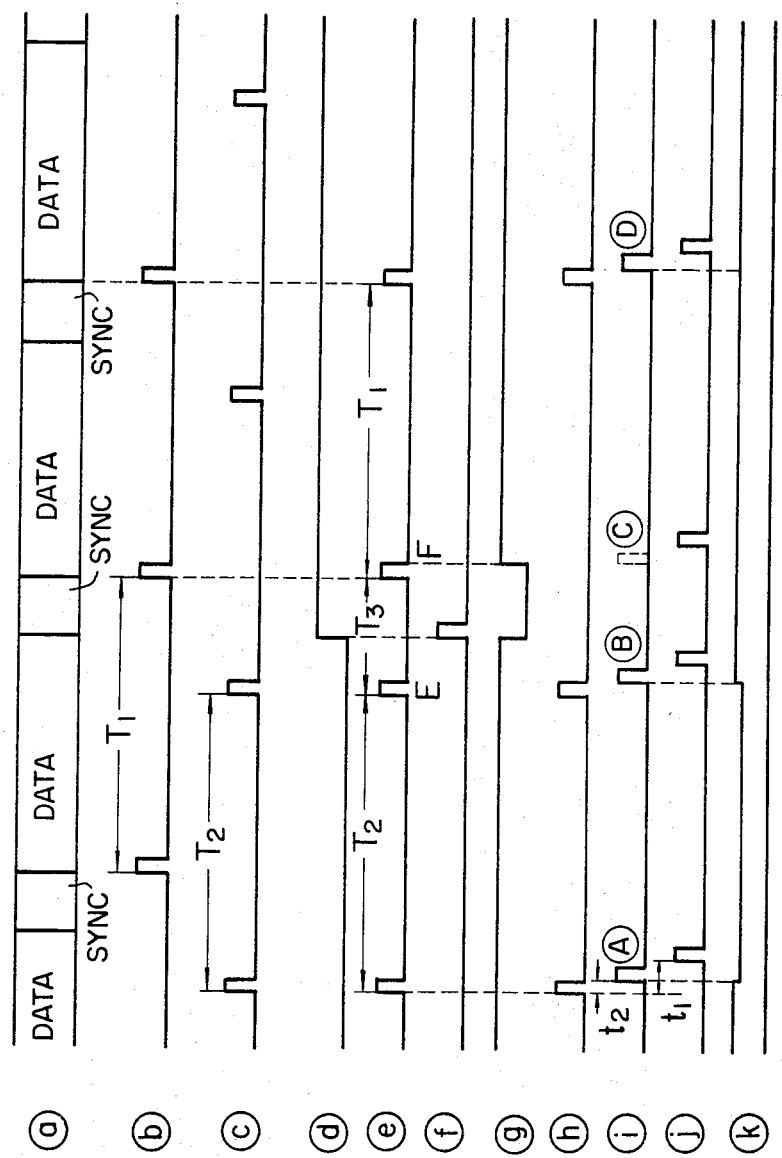
Figure 18:
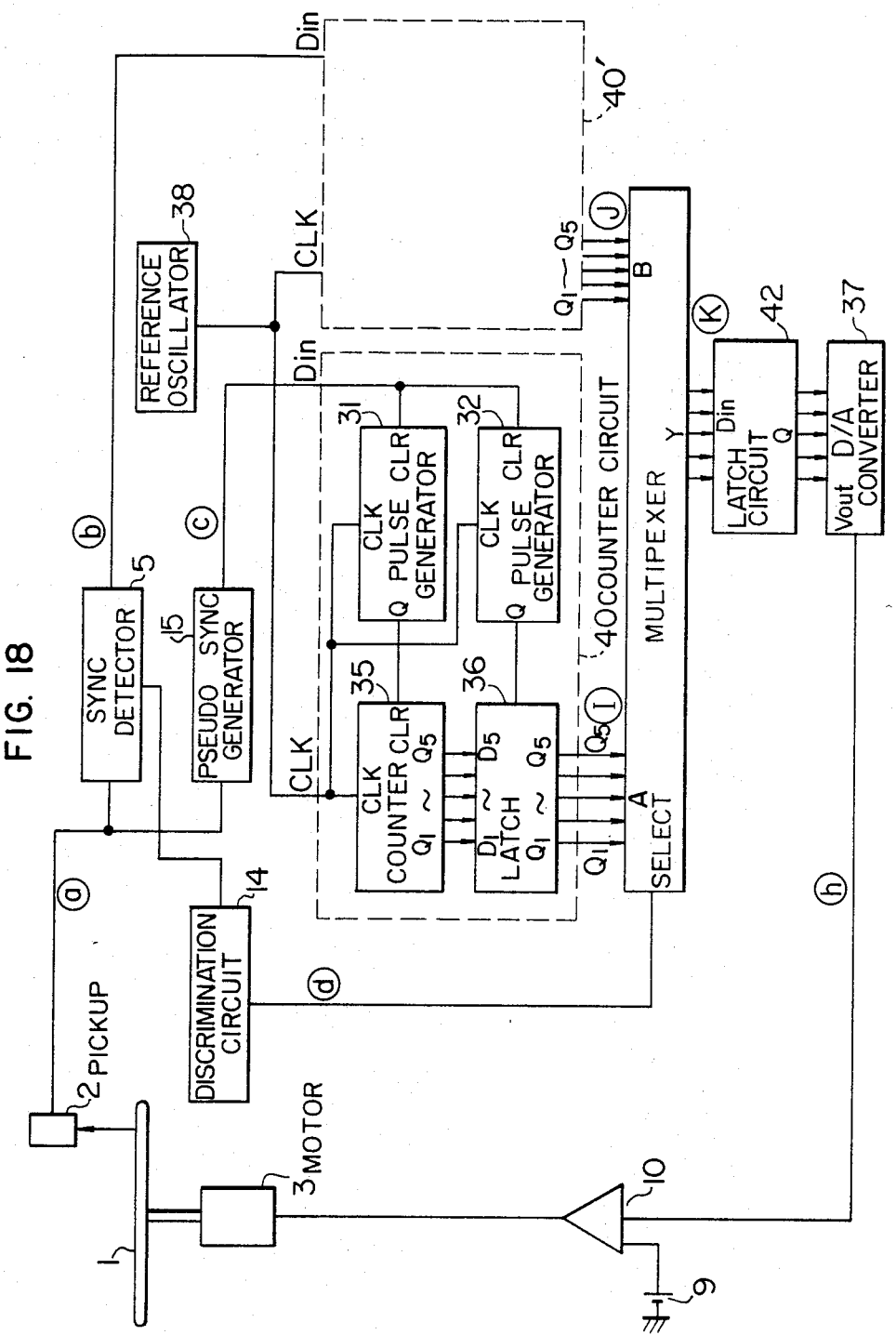
Figure 19:
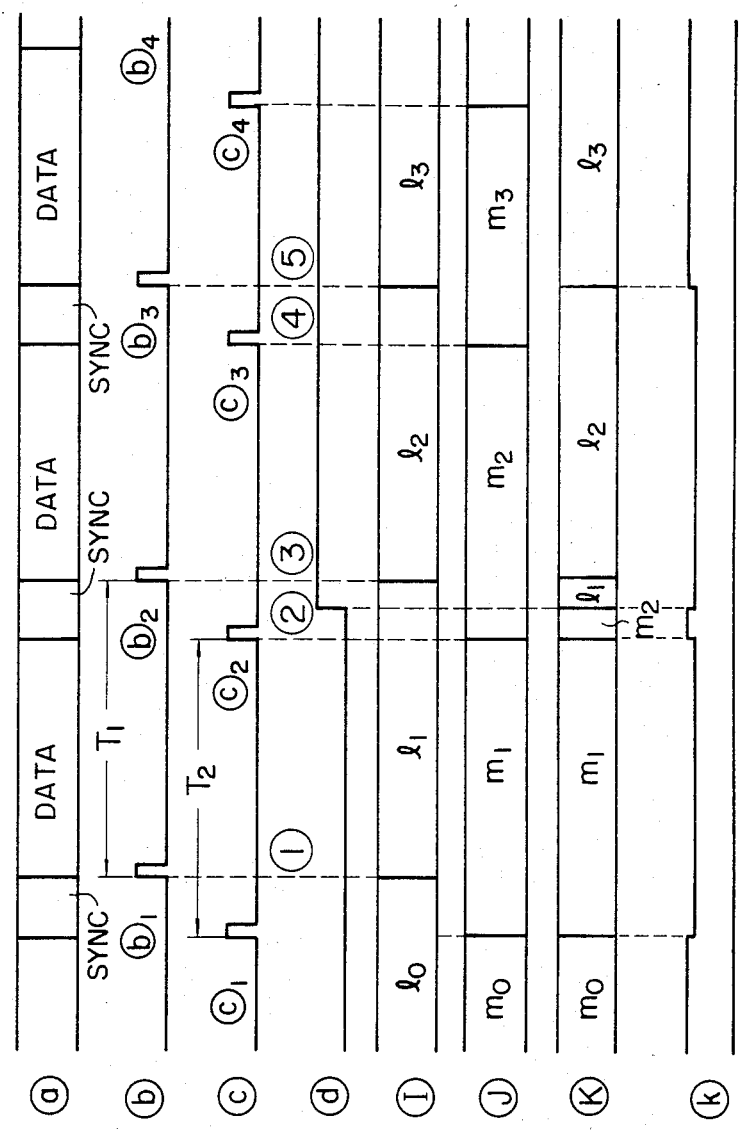

FIG. 15, consisting of (a)-(c), is an illustration showing the principle of the frequency-to-voltage converting counter;

FIG. 16 is a block diagram showing the sixth embodiment of the present invention;

FIG. 17, consisting of ⓓ-ⓚ, is a trming chart showing the operation of the arrangement shown in FIG. 16;

FIG. 18 is a block diagram showing the seventh embodiment of the present invention; and FIG. 19 is a timing chart showing the operation of the arrangement shown in FIG. 18.

Figure 4:
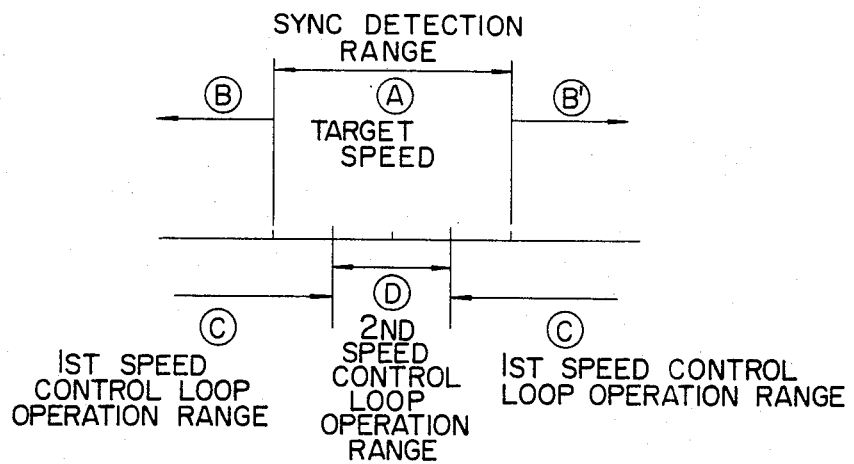
FIG. 4 is an illustration showing the basic concept of the present invention.

FIG. 4 shows the basic concept of the present invention, where the first speed control loop brings the motor speed into range Ⓐ in which sync signals can be detected, then following the detection of sync signals, control is transferred to the second speed control loop which controls the motor speed to the target speed. Thus in FIG. 4, the first speed control loop operates in ranges Ⓒ and the second speed control loop operates in range Ⓓ.

Figure 2:
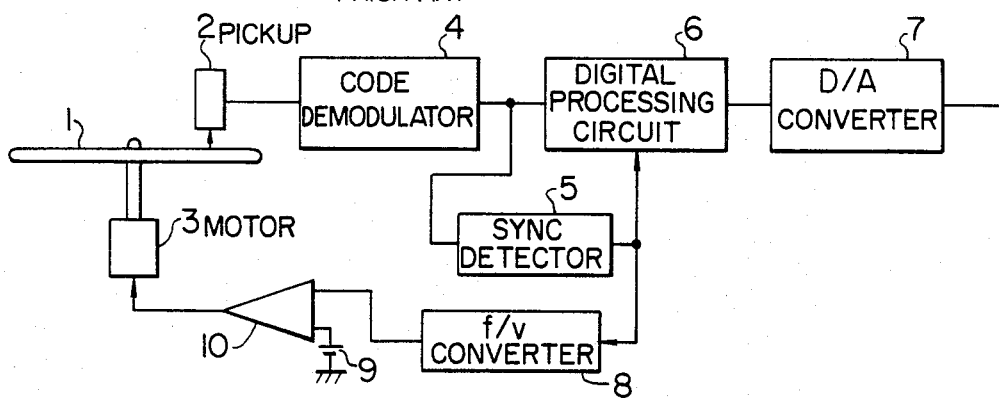
FIG. 2 is a block diagram showing the arrangement of the conventional disc reproducing system.
Figure 3:
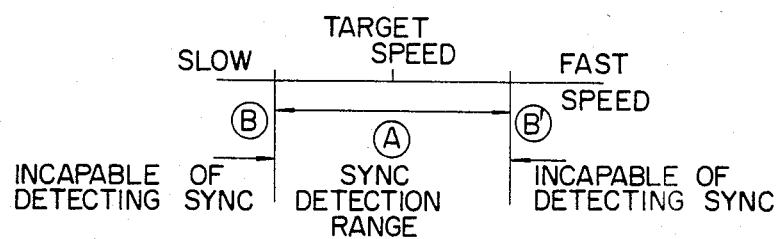
FIG. 3 is an illustration explaining the problems in the conventional system.
Figure 5:
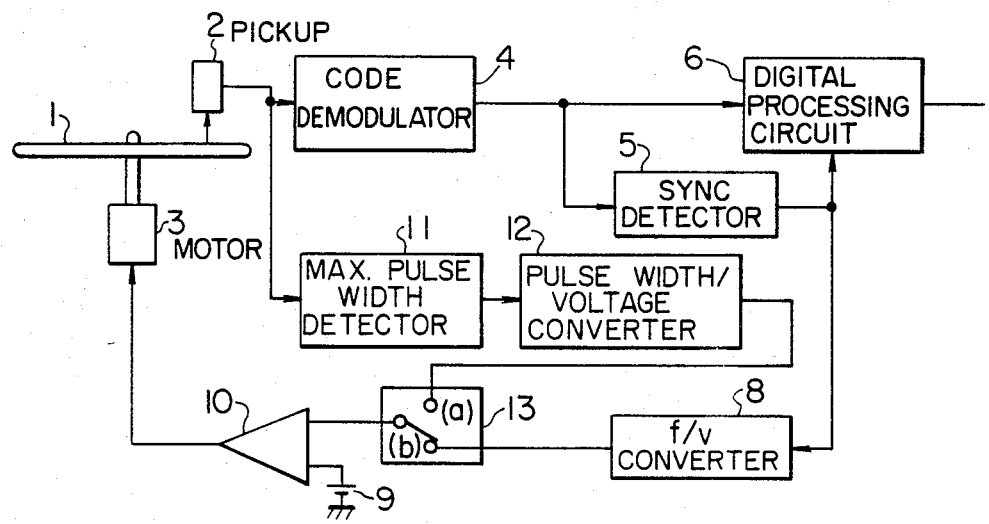
FIG. 5 is a block diagram showing the first embodiment of the present invention.

FIG. 5 shows the speed control system embodying the present invention where the same reference numbers are used for identical portions shown in FIG. 2. Before sync signals are retrieved by the sync signal detector 5, maximum pulse width detector 11 operates to search at a certain time interval the maximum pulse width of signals read out on the disc 1 by the pickup 2, then the detected maximum pulse width signal is transformed into a voltage signal by pulse width-to-voltage converter 12. Switch 13 is positioned to contact (a) and the motor 3 is driven in accordance with the voltage signal. This control system will be called here the first speed control loop, which operates in range Ⓒ as shown in FIG. 4. When the motor speed enters range Ⓐ, in which the sync signal detector 5 can detect sync signals, under control of the first speed control loop, the switch 13 is positioned to contact (b) and the motor speed is controlled to the target speed in accordance with the sync signals. This control system will be called here the second speed control loop. If the maximum pulse width could always be measured accurately, the motor speed control would be possible solely by the first speed control loop. In fact, however, the second speed control loop is needed because, (1) there is a time lag in detecting the maximum pulse width due to sampling at a certain interval, (2) the measurement accuracy is not high enough since the maximum pulse width is shorter than the interval of sync signals, and (3) detection of the maximum pulse width is susceptible of failing due to a dropout of signal and a scar on the disc. Particularly, the sync signal detector 5 can have the ability for retrieving a sync signal which has been lost due to a scar on the disc or a dropout, and therefore the second speed control loop can be made less affected by external disturbances.

Figure 6:
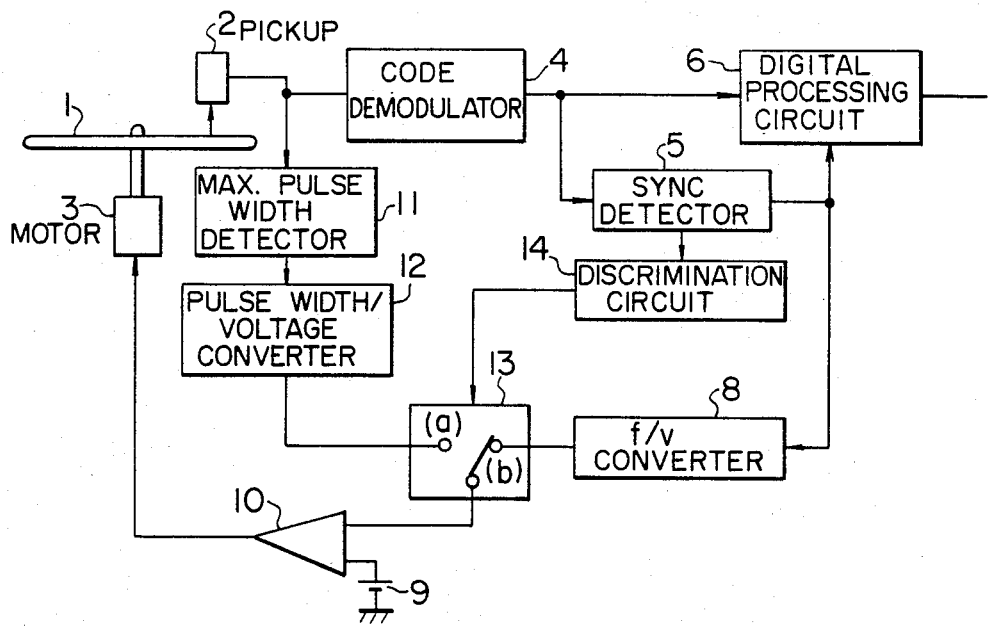
FIG. 6 is a block diagram showing the second embodiment of the present invention.

FIG. 6 shows another embodiment of the present invention, which differs from the arrangement of FIG. 5 in that the switch 13 is operated automatically by a discriminator 14 which determines whether the sync signal detector 5 has detected a sync signal.

Figure 1:
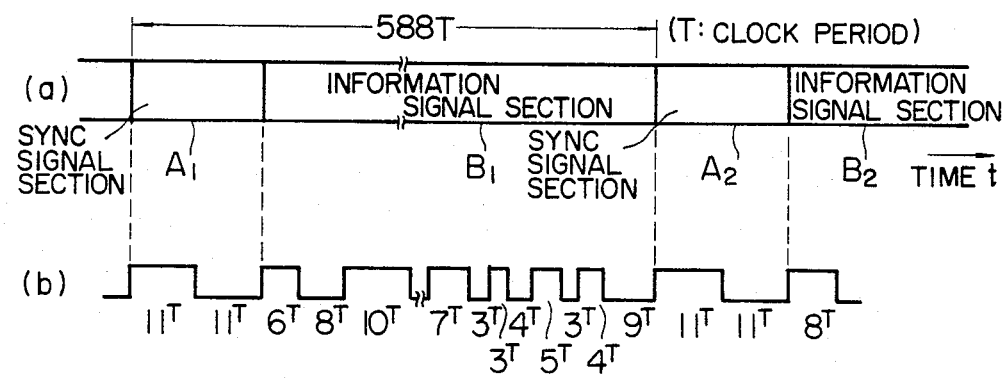
FIG. 1 is a waveform diagram exemplifying the recording system for PCM signal.
Figure 7:
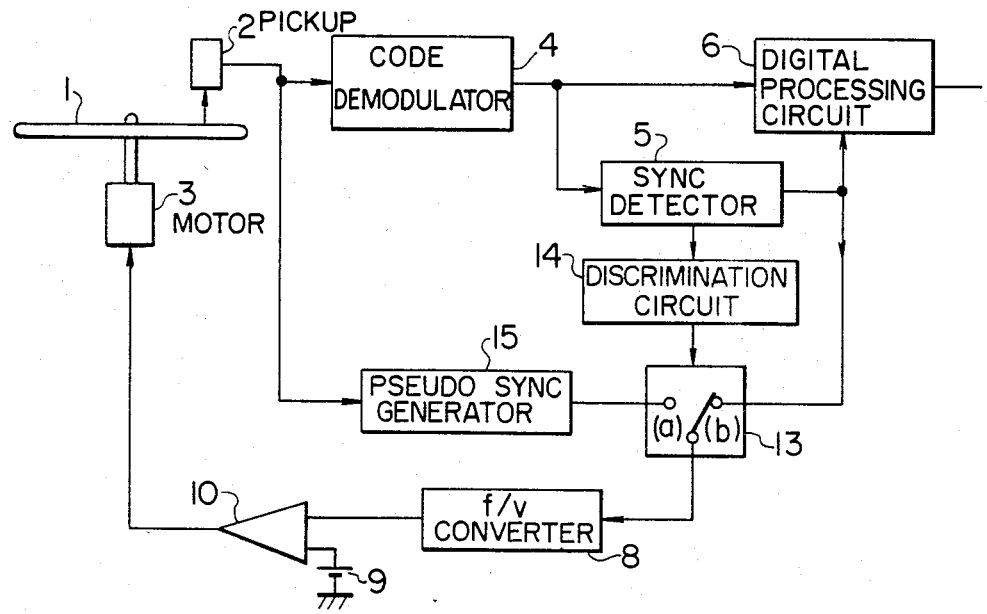
FIG. 7 is a block diagram showing the third embodiment of the present invention.
Figure 8:
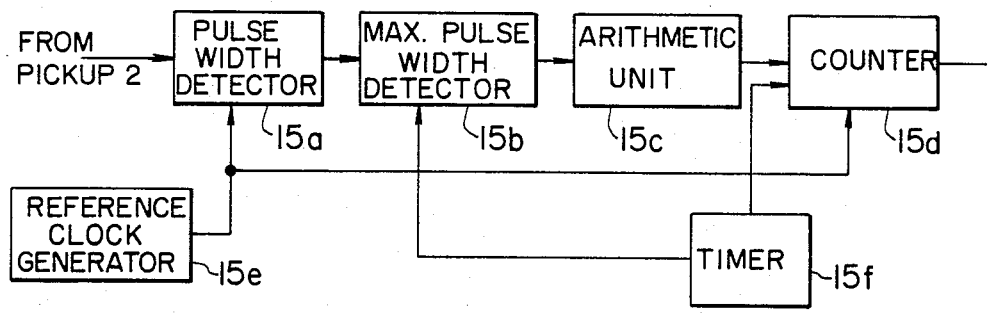
FIG. 8 is a block diagram showing in detail the pseudo sync signal generator shown in FIG. 7.

FIG. 7 shows still another embodiment of the present invention, which differs from the arrangement of FIG. 6 in that a pseudo sync signal generator 15 is provided and the switch 13 is located in front of the f/v converter 8. The pseudo sync signal generator 15 can be arranged, for example, as shown in FIG. 8. Before explaining the system of FIG. 7, the operation of the pseudo sync signal generator shown in FIG. 8 will be described using the signal waveform shown in FIG. 1. Pulse width detector 15a measures the width of pulses from the pickup 2 by counting the reference clock provided by reference clock generator 15e. Maximum pulse width detector 15b holds the highest count out of those counted by the Max. pulse width detector 15a. Arithmetic unit 15c may be constituted, for example, by a multiplier or a ROM as described hereafter and arranged to determine the ratio of frequency devision of the counter 15d on the basis of the output of the Max. pulse width detector 15b. The pulse width in the time interval determined by the timer 15f. If the timer 15f is set such that one synchronizing signal is necessarily made to exist in the measuring interval determined by the timer 15f the output of the Max. pulse width detector 15b indicates the length of the signal 11T at that time. By multiplying this output of the Max. pulse width detector 15b by M/11 (M being 588),. the length of 588T at that time, that is, the frame period as shown in FIG. 1 can be obtained. Assuming that the reference clock frequency is N/T and the motor 3 is rotating at a speed K times the target speed, the widest pulse shown with 11T in FIG. 1 will have a pulse width of 11T/K, and the detector 15a detects the maximum count of 11T/K×N/T=11N/K and sets it to the detector 15b. The arithmetic unit 15c multiples the maximum count by the ratio of the sync signal interval to the maximum pulse width, i.e., M/11 fold in the case of FIG. 1. Accordingly, the arithmetic unit 15c outputs the value of (11N/K)×(M/11)=NM/K. Counter 15d is preset to the output of the arithmetic unit 15c as a frequency division ratio by the timer 15f and counts the reference clock. Then the counter 15d provides a pulse for every (NM/K)/N/T=MT/K. This means that when the motor rotates at a speed K times the target speed, the counter provides a pulse in each period of the sync signal. Thus the signal is equivalent to the sync signal, and this signal is called pseudo sync signal. The maximum pulse width detector 15b is reset when arithmetic unit 15c has been set by the timer 15f so that it holds the subsequent maximum pulse width data.

In the arrangement of FIG. 7, the pseudo sync signal provided by the pseudo sync signal generator 15 is used for setting the switch 13 to contact (a) so as to form the first speed control loop, and after the sync signal detector 5 has detected and reproduced a sync signal, the switch 13 is set to contact (b) so as to form the second speed control loop for the motor 3. In the arrangement of FIG. 7, the first and second speed control loops have the same signal frequency when the motor speed has reached the target speed, providing advantageously a smooth switching of the switch 13, whereas the variation of gain occurs between the f/v converter 8 and the pulse width-to-voltage converter 12 in the arrangements of FIGS. 5 and 6.

According to the present invention, as described above, the motor speed can be controlled to the specified target speed even if the range of sync signal detection is narrow. Although a specific pulse having the maximum pulse width is used in the above description, it is not limited to this and a specific pulse having the minimum pulse width may be used. The present invention has been described taking for example the disc signal reproducing system, however, this invention is of course not limited to the disc signal reproducing system.

The sync signal detector 5 used in the arrangements of FIGS. 5 through 7 detects sync signals included in the signal picked up on the disc and provides only sync pulses. This circuit section is capable of retrieving a sync signal in a correct timing when it is missed due to a scar on the disc and the like. However, the ability of the sync signal detector 5 for retrieving sync signals has a restriction caused by the recording modulation system. The recording system for the PCM signal shown in FIG. 1 operates under a reference clock of 4.3218 MHz, and information is recorded in the form of pulses having widths in the range from 3T to 11T as mentioned previously based on the unit clock interval T of 1/4.3218 MHz. The sync signal has a pattern of a high level for a duration of 11T followed by a low level for a duration of 11T or a low level for 11T followed by a high level of 11T, and it is recorded at an interval of 588T. Thus the sync signal has a frequency of 4.3218 MHz/588=7.35 kHz. Signals having durations of 3T, 4T, 5T, . . . , 10T, and 11T in the picked up signal must be distinguished accurately by counting the clock, and in order to distinguish signals having durations of 10T and 11T, the signal of 11T needs to last 10.5T or longer, and the variation of the sync signal frequency must be less than $\pm 0.5/11$, i.e., $\pm 4.5\%$, of the stated frequency.

On this account, when the sync signal frequency varies more than $\pm 4.5\%$, the sync signal detector 5 cannot identify the sync signal and does not provide reproduced sync signals.

Figure 9:
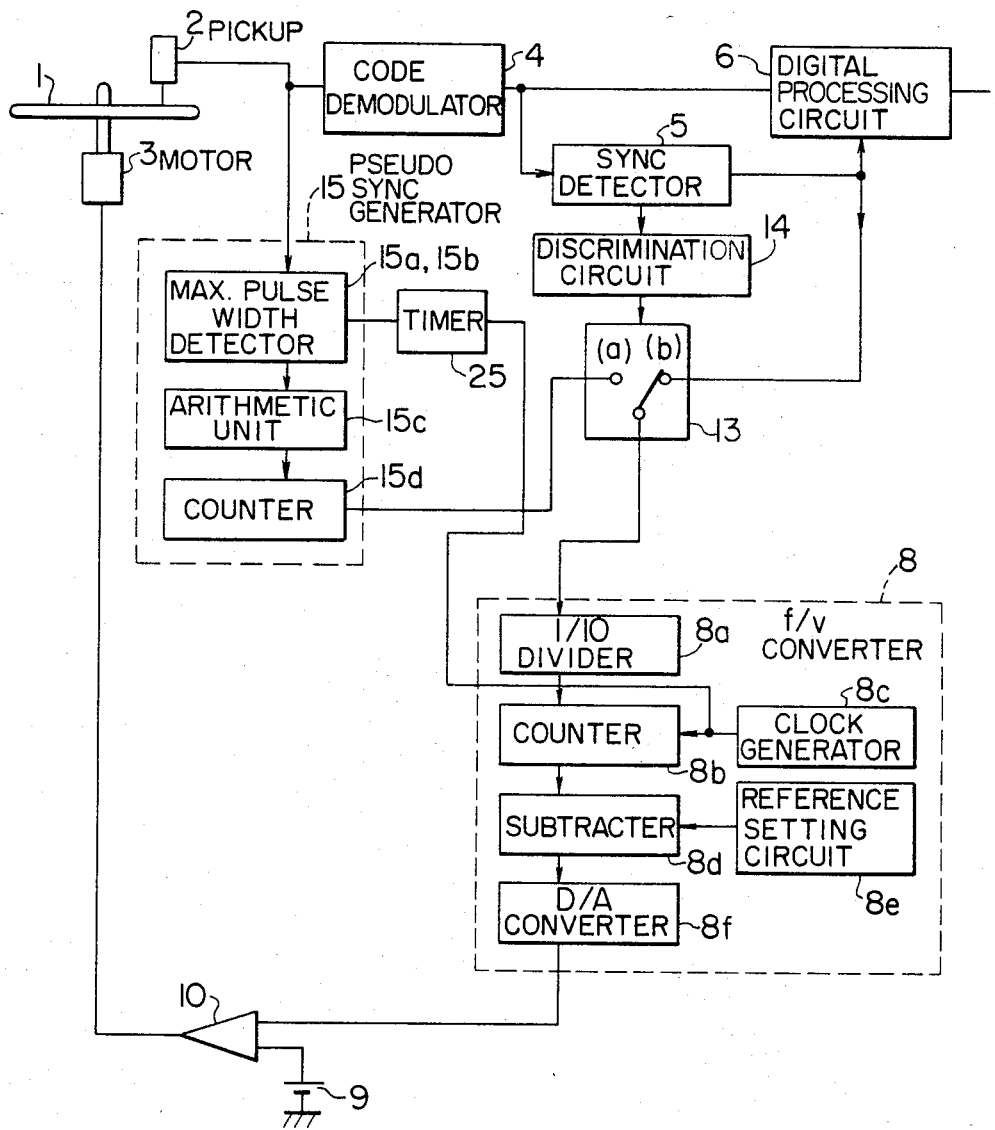
FIG. 9 is a block diagram showing the fourth embodiment of the present invention.

The digitized f/v converter 8 is made up of a 1/10 frequency divider 8a, a counter 8b, reference clock generator 8c, a reference setting circuit 8e, a subtractor 8d, and a D/A converter 8f, as shown in FIG. 9. Reproduced sync signals provided by the sync signal detector 5 are counted down by the 1/10 frequency divider 8a and fed to the counter 8b as gate signals. Then the counter 8b counts the clock from the clock generator 8c so as to measure the period of the sync signal. The subtracter 8d provides the difference between the detected sync period and the reference value from the reference setting circuit 8e. The D/A converter 8f produces a voltage in proportion to the difference, and the voltage is amplified by amplifier 10 so as to establish the necessary loop gain. The output of the amplifier 10 is applied to the motor 3. Thus the motor speed is controlled in a closed loop so that the playback speed for the disc 1 is kept constant.

Accordingly, the sync signal detector 5 operates only when the sync signal frequency is within the range of $\pm 4.5\%$ of the normal frequency, and thus sync signals are not reproduced during a start-up period. The purpose of the pseudo sync signal generator 15 is to provide pseudo sync signals until the sync signal detector 5 starts operating so that the motor speed is pulled to the normal speed during this period. The switch 13 is controlled by the discriminator 14, which determines whether or not a sync signal is detected, and positioned to contact (a) during the start-up phase and positioned to contact (b) in the normal operation. The operation of the pseudo sync signal generator 15 will be described. As mentioned previously, the arrangement of the present invention uses signals having pulse widths of 3T-11T, and a pattern of consecutive high level and low level or consecutive low level and high level each lasting 11T is assigned to the sync signal with the sync interval of 588T. Therefore, even if sync signals cannot be detected, the period of the sync signal can be obtained by detecting a pulse having the maximum pulse width and multiplying its interval by 588/11. The pseudo sync signal generator 15 is identical to that shown in FIG. 8, and the maximum pulse width detector is shown by 15b in the circuit. The maximum pulse width detector 15b measures the pulse width using pulses at least narrower than the unit interval T, and obtains the maximum pulse width periodically. The arithmetic unit 15c multiplies the maximum pulse width obtained by the detector 15b by 588/11 and anticipates the interval of sync signals. The counter 15d generates pseudo sync signals by dividing the frequency of the pulses for measuring the pulse width basing on the division ratio obtained by the arithmetic unit 15c.

In measuring the maximum pulse width during a start-up period, if the detection period is too short, the widest pulse (having a duration of 11T in the PCM system shown in FIG. 1) cannot be included within the detection period, resulting possibly in a failure of the pseudo sync signal. On this account, the arrangement of the present invention is designed such that the detection period for measuring the maximum pulse width is set longer than the duration of the widest pulse so that the maximum pulse width can always be measured within the detection period.

As mentioned previously, when the system operates outside the range of sync signal detection, the switch 13 is positioned to receive the output of the pseudo sync signal generator 15 for anticipating the period of sync signals basing on the maximum pulse width of signals. Then the control voltage is produced through the f/v converter 8 and amplifier 10 and applied to the motor 3 so as to perform the speed control of the motor.

The maximum pulse width detector 15b determines the maximum pulse width within the detection period which is determined by the timer 25 which receives the output of the reference signal generator 8c. Since the widest pulse of 11T occurs repetitively at least in a period of 588T, when the detection period of the timer is set longer than 588T, the widest pulse of 11T is always included in the detection period.

Figure 10:
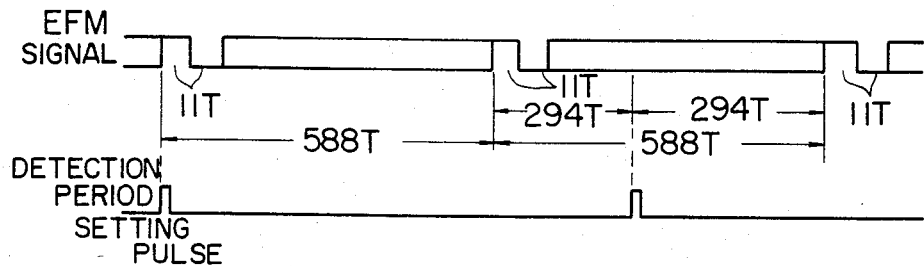
FIG. 10 is a timing chart for the fourth embodiment.

FIG. 10 shows the timing relationship when the detection period for the maximum pulse width is set to 1.5 times the period of the sync signal. As can be seen from this figure, it is possible to measure the width of the 11T pulse irrespective of the phase relationship between the sync signal (11T) and the detection period setting pulse, allowing an accurate anticipation for the sync signal period. Consequently, as the playback speed decreases below 1/1.5 approximately, there appear cases where the maximum pulse 11T is not included within the detection period, resulting possibly in a failure of anticipation for the sync signal. In practice, however, the maximum pulse width 11T is also included in portions other than the sync signal, and there is no practical problem so far as the detection period setting pulse is set in the timing relationship as shown in FIG. 10.

In case the playback speed varies significantly such as in a start-up period of the motor, the playback speed can be pulled into the target speed surely by setting the detection period setting pulse in the timing as shown in the next embodiment.

Figure 11:
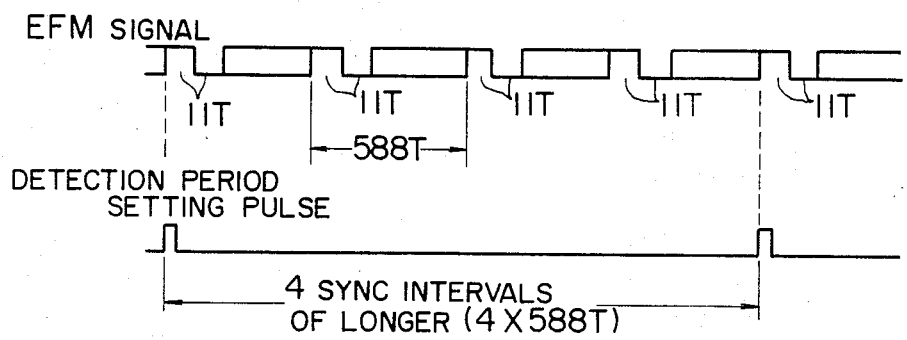
FIG. 11 is another timing chart for the fourth embodiment.
Figure 12:
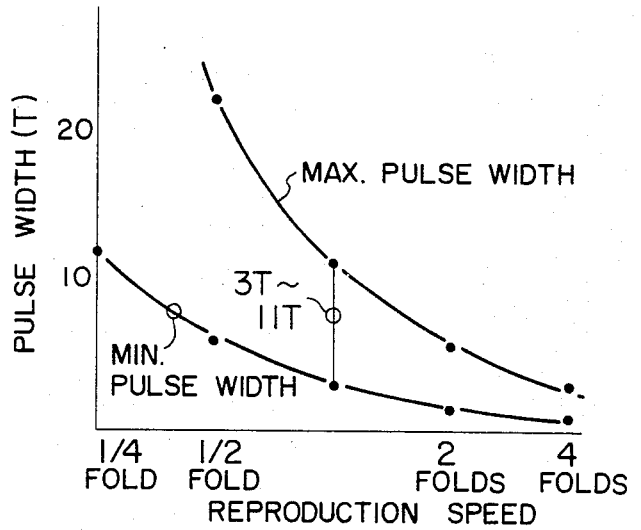
FIG. 12 is a graphical representation showing the playback speed vs. signal pulse width.

FIGS. 11 and 12 show an embodiment which can bring the playback speed into the target speed from an arbitrary speed within a wide range of playback speed.

FIG. 11 is a timing chart explaining the operation of this embodiment, and FIG. 12 shows the variation of the maximum and minimum pulse widths when the playback speed is varied from $\theta$ to 4 folds of the normal speed. As shown in FIG. 11, the detection period is set longer than four sync signal intervals ($4 \times 588T$). In this case, when the playback speed ranges from $\frac{1}{4}$ of the normal speed to infinity, the maximum pulse width 11T is always included within the detection period and the sync signal period can be anticipated correctly. On the other hand, if the playback speed slows down below $\frac{1}{4}$ of the normal speed, the maximum pulse width will not be included within the detection period occasionally. In this case, however, the minimum pulse width also extends longer than 12T as shown in FIG. 12, and the pseudo sync signal generator 15 always provides a signal wider than the sync signal interval so that the motor 3 is accelerated. Consequently, the rotational speed of the disc 1 increases, and when the playback speed exceeds $\frac{1}{4}$ of the normal speed, the system detects the maximum pulse width and controls the motor speed to the normal playback speed as described previously.

Accordingly, by choosing the detection period to be longer than the sync signal period multiplied by the ratio of the maximum pulse width to the minimum pulse width of signals, e.g., $(11T/3T) \times 588T$ or longer, any playback speed in the range from zero to infinity can be pulled into the target playback speed.

In consequence, according to the present invention, the pseudo sync signal can be generated correctly in a wide range of playback speed, and it can be pulled into the target playback speed.

Figure 13:
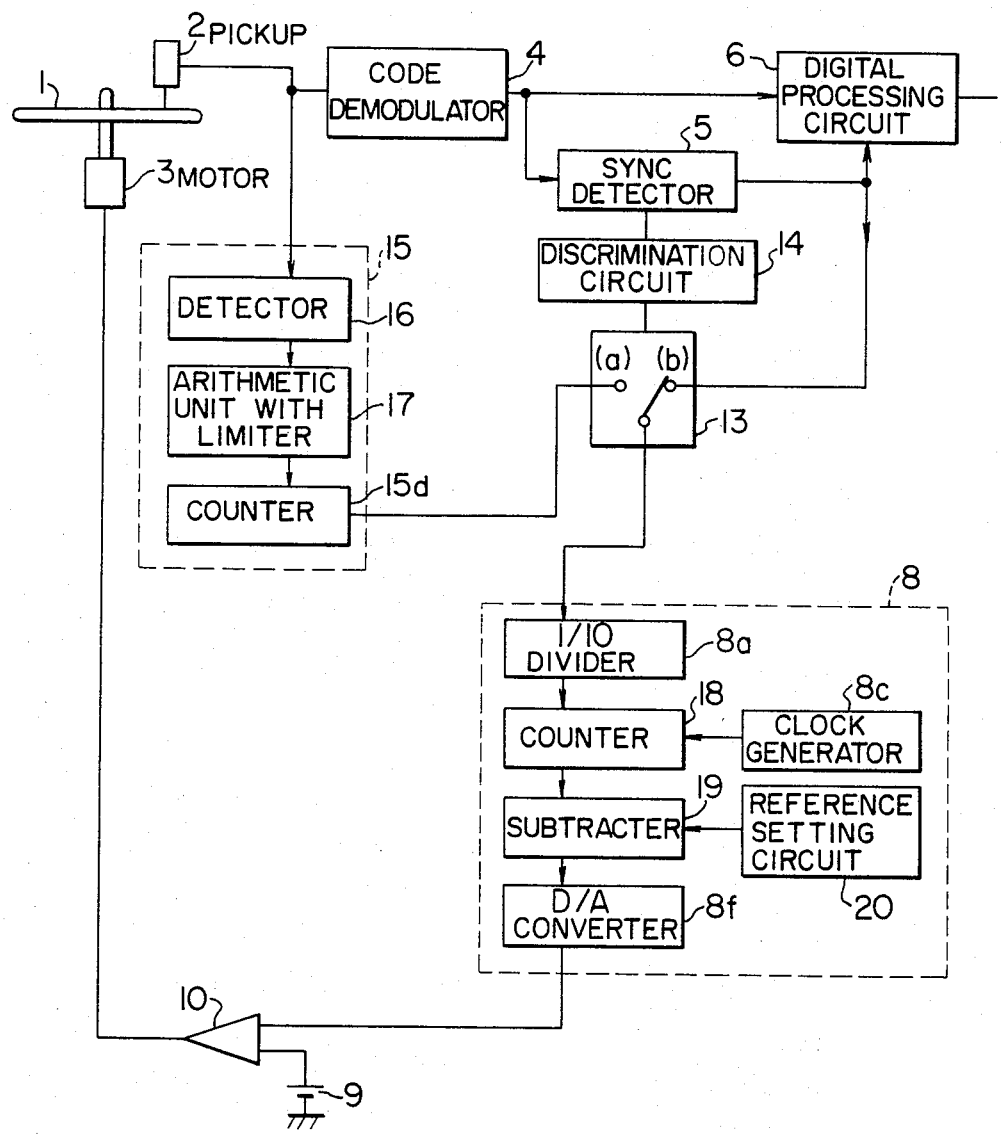
FIG. 13 is a block diagram showing the fifth embodiment of the present invention.

FIG. 13 shows the arrangement suitable for being fabricated into LSI. The arrangement resembles that of FIG. 9, but some functional blocks have different characteristics as follows. Max. pulse width detector 15b shown in FIG. 9 are replaced in FIG. 13 with a detector 16 which has a certain upper limit for the count. The arithmetic unit 15c in FIG. 9 for calculating the sync signal period is replaced in FIG. 13 with an arithmetic unit with limiter 17 which limits the calculated value depending on the count of the limiting detector 16 in calculating the period of the pseudo sync signal. The counter 8b in FIG. 9 for measuring the period of the sync signal is replaced in FIG. 13 with a repetitive counter 18 which has a less number of bits and counts the inputs repetitively. FIG. 14 summarizes the differences of both arrangements. In FIGS. 9 and 13, functional blocks with the same reference numbers have the same functions.

Signals picked up on the PCM disc 1, which has a record of information signal and sync signal recorded in the foregoing recording modulation system, is fed to the sync signal detector 5 so that sync signals are extracted from the signal. Then the sync signals are fed through the switch 13 to the f/v converter 8. The frequency of the sync signal is 7.35 kHz as mentioned above and the oscillation frequency of the reference signal generator 8c is assumed to be 4.3218 MHz. The 1/10 frequency divider 8a, which is used for improving the accuracy in measuring the sync signal period by the counter 18, provides the output in a frequency of 735 Hz. Measuring the period of the 735 Hz signal by counting the 4.3218 MHz pulses from the reference signal generator 8c results in a count of 5880. Referring to FIG. 15, the operation of the counter 8b for measuring the interval of the reproduced synchronizing or psuedo synchronizing signals and the simplification in the number of stages of the arrangement therefor will be described hereunder. In FIG. 15(a), the abscissa represents the synchronizing signal interval (5880) frequency-divided by 10 by the divider 8a and the ordinate represents the count value of the counter. As the rotational speed becomes high, the interval of the synchronizing signal becomes narrow and the count value of the counter 8b becomes smaller than 5880, while, on the contrary, if the rotational speed becomes low, the interval of the synchronizing signal becomes wider and the count value of the counter 8b becomes larger the 5880. A value proportional to an amount of shift in rotation can be obtained by obtaining the deviation from the value 5880 by the subtractor 8d. In this case, the counter 8b counter 5880 and therefore the number of stages of the arrangement thereof is 13, resulting in a larger scaled circuitry. However, as mentioned above, the output frequency of the sync signal detector 5 varies within the range of ±4.5%. Thus the counter operates inside the range of ±4.5% of 5880 counts, i.e., 5615 to 6145 counts, and a dynamic range of 530 counts is merely needed. Accordingly, the counter merely needs the capacity as large as 530 counts, and a 10-bit counter suffices for this purpose. On this account, the counter 18 is provided with less number of bits than the counter 8b in FIG. 9 and operated to count repetitively as shown in FIG. 15(b). It is sufficient to provide a dynamic range (range D) for repetitive count wider than the range of sync signal detection. In order to minimize the number of bits of the counter 18, it is necessary to preset the counter so that the center value of counts coincides with the target count. Since the counter 18 of this embodiment has the minimum count of 10, providing a capacity of 1024 counts, and the counter should be preset to 1024 (5880-512-(1024×5))=776 in order to obtain the center value of 512.

By using the above-mentioned counter system for the counter 18 in FIG. 13, the number of bits of the counter can be reduced from 13 bits for that of counter 8b in FIG. 9 to 10 bits, whereby the number of circuit elements can be reduced. The subtractor 8d and reference value setting circuit 8e can also be simplified from each 13 bits to 10 bits as shown by subtracter 19 and reference value setting circuit 20. The D/A converter 8f provides the voltage output in response to the output of the subtractor 19, and eventually the motor speed is controlled on the feedback basis so as to maintain the playback speed constantly.

The following will describe the starting operation of the motor. The pseudo sync signal generator 15 shown in FIG. 9 generates pseudo sync signals in accordance with the maximum pulse width. If the period of pseudo sync signals were to be measured according to the counting characteristics shown in FIG. 15(a), there would be no problem for measuring the period accurately. However, if pulses are counted by the reduced-bit counter 18, the period of pseudo sync signals can exceed the range D as shown in FIG. 15(b), resulting in an erroneous count. In order to prevent such failure, the arrangement must be made such that the count is maintained at the maximum or minimum value of the range D if the period of pseudo sync signal exceeds the range D. This limiting characteristics as shown in FIG. 14 are obtained by the arithmetic unit 17. The arithmetic unit 17 performs multiplication by 588/11, and this operation can advantageously be carried out by way of table look-up using ROM (Read Only Memory) or PLA (Programmable Logic Array) rather than employing a complicated digital multiplier. The output characteristics of the arithmetic unit 17 as shown in FIG. 14 can readily be made using ROM or PLA, and the total circuit arrangement can be simplified. Moreover, in order to use ROM or PLA of minimal size, the detector 15a, 15b in FIG. 9 are modified to have the upper limit of the count as shown in item 16 of FIG. 4. Provision of the upper limit for the counter can readily be realized by providing the counter with the minimum necessary bits and operating the counter to be disabled when the counter overflows.

As described above, the counter 18 in FIG. 13 is arranged in 10 bits and operated repetitively as shown in FIG. 14, the counter 18 is provided with the limiter as shown in FIG. 14, the output limiter is provided for the arithmetic unit 17, so that the frequency of the pseudo sync signal varies within the dynamic range of the counter 18, whereby the overall circuit arrangement can be simplified considerably without sacrificing the functions of the system shown in FIG. 9.

In FIG. 9, when the playback speed has entered the detection range of the sync signal detector 5, the switching discriminating circuit 14 operates on the switch 13 to receive the speed signal from output of the sync signal detector 5 so that the motor speed is controlled basing on the sync signal. At the time of switching the output of the switch 13 is switched immediately from the pseudo sync pulse generated by the pseudo sync signal generator 15 to the sync pulse produced by the sync signal detector 5. However, the time interval from the pseudo sync pulse to the first sync pulse from the sync signal detector, i.e. T₃ (this time interval will be termed "skew generation period" hereinafter) differs from period T₂ of pseudo sync pulses and period T₁ of sync pulses, causing the control voltage to the error amplifier 10 to vary significantly, making it difficult to achieve smooth speed control.

FIG. 16 shows an embodiment of the system in which the output of the playback speed detecting circuit is not used during the skew generation period, but the playback speed is controlled by the signal which has been fetched period to the generation of skew.

The arrangement of FIG. 16 measures the pulse interval of the speed detection signal and transforms the count into a proportional voltage so as to perform the speed control. The count is latched and control during the skew period is carried out basing on the count data which has been held before the skew period, and control can be stabilized at the time of skew.

The operation of the arrangement of FIG. 16 will be described with reference to the timing chart shown in FIG. 17. The arrangement includes a pulse generator 30 which generates a pulse in response to the variation of the output ⓓ of the switching discrimination circuit 14. Pulse generators 31 and 32 provide delayed pulses. Both pulse generators 31 and 32 receive the output ⓔ of the switch 13, and produce pulse signals ⓙ and ⓘ with delay times of t1 and t2, respectively, following the input. D-type flip-flop 34 receives the reset signal from the pulse generator 30 and the clock signal from the output e of the switch 13, and disables gate 33 for a certain period when the switch 13 is positioned to the sync signal detector 5. Counter 35 measures the duration of the pulse from the pulse generator 31, latch 36 holds data from the counter 35, D/A converter 37 converts digital signal into analog signal, and oscillator 38 provides the reference pulse signal.

The output ⓔ of the switch 13 is fed to the pulse generator 31, which delays the input by t1 to provide the reset signal ⓙ for the counter 35. The counter 35 receives the clock from the reference pulse oscillator 38 and counts the interval of the reset signal ⓙ. The pulse generator 32 delays the signal ⓗ through the gate 33 by t2 and produces the latch clock signal ⓘ. The latch 36 holds the contents of the counter 35 temporarily in response to the latch clock ⓘ. The contents of the latch 36 represent the interval of input pulses ⓔ from the pulse generator 31, i.e., the count representing the interval of speed detection signals. This count data is transformed into analog voltage by the D/A converter 37 so as to control the motor speed.

The operation of the arrangement with the digital f/v converter 8 has been described.

When the switch 13 is turned to receive the output of the sync signal detector 5, a skew is generated on the output ⓔ of the switch circuit 13 (period between E and F).

According to the arrangement of the present invention, reset signal ⓕ is generated by the switching pulse generator 30. The D-type flip-flop 34 operates in response to the reset signal ⓕ and the switch circuit output ⓔ so as to disable the gate 33 ⓖ for a certain duration. Consequently, the input ⓗ of the pulse generator 32 which produces the latch clock ⓘ is blocked by the gate 33 for a certain duration following the switching so that the latch clock is not generated.

This operation is shown at the latch clock ⓘ. Latch clock pulses are generated in a sequence of pulses Ⓐ, Ⓑ, Ⓒ and Ⓓ, each following the output ⓔ of the switch circuit with a delay of t2. After switching, the input is interrupted by the gate signal g and the latch clock pulse Ⓒ is not produced actually. During the skew period, the latch 36 does not take in data, but holds the previous data. Thus the output of the D/A converter 37 does not vary and the speed control for the motor 3 is performed smoothly.

FIG. 18 shows still another embodiment of the present invention, where there are provided two systems of counter circuit 40' for measuring the interval of the output ⓑ from the sync signal detector 5 and counter circuit 40 for measuring the interval of the output ⓒ from the pseudo sync signal generator 15, and the motor 3 is controlled by selective use of the outputs ⓘ and ⓙ from the counter circuits 40' and 40. In FIG. 18, the same reference numerals are used for circuit blocks which are identical to those shown in FIG. 16. The following will describe the operation of the arrangement of FIG. 18 with reference to the timing chart shown in FIG. 19.

The counter circuit 40 is made up of pulse generators 31 and 32, a counter 35 and a latch 36, and the counter circuit 40' has the same arrangement. Both counter circuits measure the duration of their input pulses ⓑ and ⓒ by each counter 35 and hold the count results. The pulse generators 31 and 32 operate in the same timing conditions as described in connection with FIGS. 16 and 17. Duration $T_1$ of the output $\text{ⓑ}_1$ of the sync signal detector 5 is measured during the period of $\text{ⓑ}_1$ and the result is held in the latch 36. In consequence, the latch 36 provides on its output $\text{Ⓘ}$ the pulse width data $l_1$ for period $\text{ⓑ}_1$ immediately before starting period $\text{ⓑ}_2$ (at a timing of ①). Subsequently, pulse width data $l_2$ and $l_3$ for periods $\text{ⓑ}_2$ and $\text{ⓑ}_3$ are outputted in the timing of ③ and ⑤, respectively.

Similarly, the pseudo sync signal generator 15 provides on its output $\text{Ⓒ}$ pulse width data $m_2$ and $m_3$ for periods $\text{Ⓒ}_2$ and $\text{Ⓒ}_3$ in the timing of ② and ④, respectively.

The arrangement further includes a multiplexer 41 for selecting the latched outputs $\text{Ⓘ}$ and $\text{Ⓙ}$ of the counter circuits 40 and 40', and a latch circuit 42 which receives data $\text{Ⓚ}$.

When the motor speed deviates from the target speed, the multiplexer 41 selects the output of the pseudo sync signal generator 15 so that the latch circuit 42 receives for its input $\text{Ⓚ}$ the output $\text{Ⓘ}$ containing data $m_n$ of the counter circuit 40. When the motor speed approaches the target speed, the switch control circuit 14 provides a high output $\text{ⓓ}$, causing the multiplexer 41 to switch the input from the output $\text{Ⓘ}$ of the counter circuit 40 to the output $\text{Ⓙ}$ of the counter circuit 40'. Then, input data $\text{Ⓚ}$ to the latch circuit 42 is switches as: $m_0 \rightarrow m_1 \rightarrow m_2 \rightarrow l_1 \rightarrow l_2 \rightarrow l_3$.

Since the motor speed is near the target speed, the duration $T_1$ of the output $\text{ⓑ}$ of the sync signal detector 5 is substantially equal to the duration $T_2$ of the output $\text{Ⓒ}$ of the pseudo sync signal generator 15, and their counts $l_n$ amd $m_n$ are also substantially equal.

In consequence, when the input data $\text{Ⓚ}$ to the latch circuit 42 is switched from $m_2$ to $l_1$, the output $\text{ⓚ}$ of the D/A converter does not vary largely, whereby the output of the pseudo sync signal detector can be switched to the output of the sync signal detector smoothly.

According to the present invention, as described above, the disturbance of the control voltage caused by a skew which occurs at switching can be suppressed considerably. The present invention can advantageously be realized in a digital circuit arrangement suitable for being fabricated on a LSI chip.

What is claimed is:

1. A reproduction speed control system for a signal reproducing apparatus comprising a speed control system which controls the reproduction speed in accordance with a signal obtained by comparing the output of a speed detection means with a reference signal in a comparison means providing an output for controlling the reproduction speed of said signal reproducing apparatus in accordance therewith, said signal reproduction apparatus being a signal reproduction apparatus for a recording medium on which are recorded digital data including synchronizing signals said speed detection means including circuit means for receiving a reproduced signal of the recorded data and providing a plurality of reproduction speed signals, said circuit means including a synchronizing signal detector which detects the synchronizing signal in the reproduced signal and a specific pulse detector which detects specific pulses other than the synchronizing signal in the reproduced signal, and a switch means for selecting the output of said specific pulse detector during the operation of said signal reproduction apparatus outside the detection range for the synchronizing signal as one of said plurality of reproduction speed signals, while selecting the output of said synchronizing signal detector during operation of said signal reproduction apparatus within the detection range therefor as another reproduction speed signal, said switch means supplying the selected reproduction speed signal as a feedback signal to said comparison means, thereby to control the reproduction speed.

2. A reproduction speed control system according to claim 1, wherein the detection period of said specific pulse detector is longer than the period of said synchronizing signal.

3. A reproduction speed control system according to claim 1, further comprising a memory means for storing a reproduction speed signal before switching, a switching control signal for said switch means being supplied to a timer circuit, which provides an output so that the reproduction speed signal before switching is fed back to said comparison means for a certain period.

4. A reproduction speed control system according to claim 1, wherein said specific pulse detector comprises a specific pulse width detector which detects the duration of a specific pulse and a pseudo synchronizing signal generator which generates a pseudo synchronizing signal in accordance with the duration of said specific pulse, said switch means applying one of an output of said synchronizing signal detector and an output of said pseudo synchronizing signal generator to said comparison means through a frequency-to-voltage converter.

5. A reproduction speed control system according to claim 4, wherein the detection period of said specific pulse detector is longer than the period of said synchronizing signal.

6. A reproduction speed control system according to claim 4, wherein the dynamic range of said frequency-to-voltage converter is set to be wider than the range of synchronizing signal detected by said synchronizing signal detector, the frequency variation range of the pseudo synchronizing signal generated by said pseudo synchronizing signal generator being made narrower than the dynamic range of said frequency-to-voltage converter.

7. A reproduction speed control apparatus for controlling the rotational speed of an electric motor to cause a recording medium carrying digital data including a synchronizing signal recorded thereon to rotate a predetermined speed, said apparatus comprising:
  psuedo synchronizing signal generator means for detecting a maximum or a minimum pulse width detection signal in a PCM signal read out by a pickup to thereby produce a rotational speed detection signal proportional to the rotation of said recording medium on the basis of said pulse width detection signal;
  synchronizing signal detector means for detecting said synchronizing signal recorded on said recording medium;
  frequency-to-voltage converter means coupled to said motor;
  switch means arranged for connection with said psuedo synchronizing signal generator means, said synchronizing signal detector means, and said frequency-to-voltage converter means; and
  discriminator means for changing over the connection of said switch means to said synchronizing signal detector means and said psuedo synchronizing signal generator means so that when said synchronizing signal is not detected, an output signal of said pseudo synchronizing signal generator means is supplied to said motor through said switch means to thereby bring the rotation of said motor into a range in which said synchronizing signal is detectable, and after said synchronizing signal is detected, changing over said switch means so that said synchronizing signal from said synchronizing signal detector means is supplied to said motor through said switch means.

8. A reproduction speed control apparatus according to claim 7, further comprising a memory means for storing a indication signal of the output of one of said pseudo synchronizing signal generator means and said synchronizing signal detector means fed back to said motor prior to change over of said switch means, a switching control signal for said switch means being supplied to a timer circuit which provides an output so that the signal prior to change over of said switch means is fed back to said motor for a certain period.

9. A reproduction speed control apparatus according to claim 7, wherein said pseudo synchronizing signal generator means comprises a reference clock generator for generating reference clocks, a first pulse width detector for detecting pulse widths of various pulse width signals from said pickup by counting said reference clocks from said reference clock generator, a timer, a second pulse width detector for detecting a maximum and a minimum pulse width of the largest or smallest count value respectively among the pulse widths detected by said first pulse width detector in a certain period of time determined by said timer, a counter for dividing the frequency of said reference clocks, arithmetic circuit means for calculating a ratio of frequency division of said counter on the basis of the count value of the pulse width detected by said second pulse width detector, said counter receiving said reference clocks from said reference clock generator and the ratio of frequency division determined by said arithmetic circuit means at said certain period of time determined by said timer to thereby divide the frequency of said reference clocks.

10. A reproduction speed control apparatus according to claim 9, wherein said certain period of time for the detection of said second pulse width detector determined by said timer is set to be longer than the period of said synchronizing signal.

11. A reproduction speed control apparatus according to claim 10, wherein said certain period of time for the detection of said second pulse width detector determined by said timer is set to be four times as large as the period of said synchronizing signal.

12. A reproduction speed control apparatus according to claim 7, wherein the dynamic range of said frequency-to-voltage converter means is set to be wider than the range of said synchronizing signal detected by said synchronizing signal detector means, the frequency variation range of the pseudo synchronizing signal generated by said pseudo synchronizing signal generator means being made narrower than the dynamic range of said frequency-to-voltage converter means.

* * * * *